UNITED STATES PATENT OFFICE.

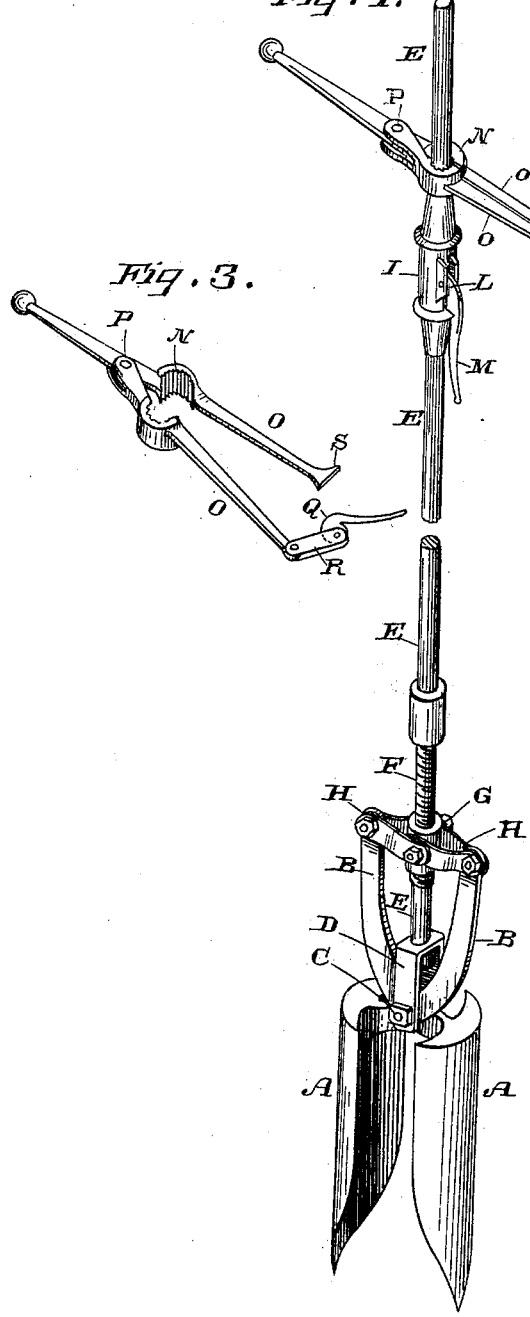

GEORGE ATKINSON, OF OAKLAND, CALIFORNIA.

WELL-BORING DEVICE.

SPECIFICATION forming part of Letters Patent No. 394,322, dated December 11, 1888.

Application filed August 1, 1888. Serial No. 281,685. (No model.)

*To all whom it may concern:*

Be it known that I, GEORGE ATKINSON, of Oakland, Alameda county, State of California, have invented an Improvement in Well-Boring Devices; and I hereby declare the following to be a full, clear, and exact description of the same.

My invention relates to certain improvements in mechanism for boring wells, which will be more fully explained by reference to the accompanying drawings, in which—

Figure 1 is a perspective view of the device, showing the excavator open. Fig. 2 is a side view showing the excavator closed and a section of the coupling-joints by which the rods are united. Fig. 3 is an enlarged perspective view of the clamp by which the rods are turned.

The excavator is composed of two semi-cylindrically-shaped scoops, A, made of stout iron, having the lower ends tapered and pointed, as shown. To the upper ends are secured the stout iron levers B, which are pivoted together at C, the arms crossing each other like those of a tongs. The fulcrum-pin C also passes through the yoke D, the arch of which crosses between the arms B, as shown plainly in Fig. 1. A hole is made in the top of the yoke, and through this the rod E passes, having a head on the lower end, which prevents its pulling out from the yoke, but allows it to be turned around freely within it. The rod E is screw-threaded, as shown at F, and a nut, G, is fitted to turn on this screw. Links H have their inner ends pivoted to the sides of the nut G, and their outer ends are connected with the upper ends of the lever B, so that when the nut G is caused to travel down the screw F until it arrives at a point between the upper ends of the arms or levers B the links H will have forced these levers apart, at the same time opening the excavator-sections A in readiness to be forced into the ground at the bottom of the well. When this has been done and the space between the sections A A is full of the material, the rod E is turned around, thus causing the nut G to travel upward upon it until it reaches the position shown in Fig. 2, when the sections A will have been closed, so as to retain the material between them, and they can then be raised to the surface and discharged. The rods E are made in convenient lengths, and in order to couple them together the upper end of each lower rod has a socket, I, fixed upon it, and the lower end of the upper rod has a correspondingly-shaped conical head, J, which enters the socket. One side of this conical head has a depression made in it, as shown plainly at K, Fig. 2, and a cam, L, is fulcrumed on the side of the socket I, so that when the lever-arm M drops downward by gravitation and lies parallel with the rod the cam-head will enter the socket K, and thus lock the rods together. By this construction the rods are easily and rapidly separated or joined, as desired.

In order to turn the rods E so as to cause the nut G to travel up and down upon the screw F, I employ a clamp composed of two parts, N, of sufficient size to clasp the rod, and corrugated upon the inside. These two clamps have levers or extensions O and are hinged together at P. When closed upon the rod, they are compressed and locked upon it by means of a cam, Q, which is fulcrumed in the link R, this link having one end attached to the end of one of the levers O. The other lever O has a toe or projection, S, over which the head of the cam Q passes when its lever is turned, and it thus compresses the clamp N with a powerful grip upon the rods, so as to turn them in either direction. The cam is easily released by throwing the handle outward, as shown in Fig. 3.

Having thus described my invention, what I claim as new, and desire to secure by Letters Patent, is—

1. The excavating-sections A, having the arms or levers B, fulcrumed through the yoke D, in combination with the rod E, having a head on its lower end and turning loosely in the yoke, a screw, F, upon the rod, and a nut, G, traveling upon said screw and connected with the levers B by the links H, substantially as herein described.

2. The excavating-sections with the levers, nuts, connecting-links, and the screw-rod E, made in sections, in combination with the uniting-joints I J and the cam L, substantially as herein described.

3. A coupling for the rod-sections of well-boring devices, consisting of the socket I upon one end of the rod and a corresponding cone, J, fitting into said socket and having the depression K, in combination with the gravitating cam L, hinged to the side of the section and locking the two together, substantially as herein described.

4. The clamp N, having the levers or extensions O, fulcrumed at P, the link R, attached to one of the levers O, and the projection or head S upon the other, in combination with the cam Q, fulcrumed in the end of the link R, substantially as herein described.

In witness whereof I have hereunto set my hand.

GEORGE ATKINSON.

Witnesses:
S. H. NOURSE,
H. C. LEE.